US012660758B2

(12) United States Patent
Jones et al.

(10) Patent No.: US 12,660,758 B2
(45) Date of Patent: Jun. 23, 2026

(54) ROUND BALER WITH POSITION ADJUSTABLE STARTER ROLL

(71) Applicant: DEERE & COMPANY, Moline, IL (US)

(72) Inventors: Austin J. Jones, Ottumwa, IA (US); William P. Schinstock, Ottumwa, IA (US)

(73) Assignee: Deere & Company, Moline, IL (US)

( * ) Notice: Subject to any disclaimer, the term of this patent is extended or adjusted under 35 U.S.C. 154(b) by 336 days.

(21) Appl. No.: 18/408,800

(22) Filed: Jan. 10, 2024

(65) Prior Publication Data

US 2025/0221344 A1     Jul. 10, 2025

(51) Int. Cl.
  *A01F 15/07*     (2006.01)
  *A01F 15/08*     (2006.01)
  *A01F 15/10*     (2006.01)
  *A01F 15/18*     (2006.01)

(52) U.S. Cl.
  CPC .......... *A01F 15/07* (2013.01); *A01F 15/0833* (2013.01); *A01F 15/106* (2013.01); *A01F 15/18* (2013.01); *A01F 15/0715* (2013.01)

(58) Field of Classification Search
  CPC ................ A01F 15/0715; A01F 15/106; A01F 2015/186; A01F 15/0833; A01F 15/18; A01F 2015/077; A01F 2015/0795; A01F 15/07; A01D 90/08; A01D 90/083; A01D 2090/086
  See application file for complete search history.

(56) References Cited

U.S. PATENT DOCUMENTS

| | | | |
|---|---|---|---|
| 3,914,926 | A | 10/1975 | Braunberger et al. |
| 8,126,620 | B2 | 2/2012 | Ringwald et al. |
| 8,626,406 | B2 | 1/2014 | Schleicher et al. |
| 8,868,304 | B2 | 10/2014 | Bonefas |
| 9,119,342 | B2 | 9/2015 | Bonefas |
| 9,457,971 | B2 | 10/2016 | Bonefas et al. |

(Continued)

FOREIGN PATENT DOCUMENTS

| | | |
|---|---|---|
| CA | 2959217 A1 | 8/2018 |
| CA | 2959257 A1 | 8/2018 |

(Continued)

OTHER PUBLICATIONS

Extended European Search Report and Written Opinion issued in European Patent Application No. 24218525.4 dated May 13, 2025, in 08 pages.

*Primary Examiner* — Brad Harcourt

(57) ABSTRACT

A round baler includes a forming belt defining a baling chamber having an inlet through which crop material enters. A belt tensioning system includes a tension arm and a plurality of moveable rollers that move for maintaining tension in a forming belt while allowing a diametric size of the bale to increase during formation. A starter roll is positioned immediately upstream of the inlet relative to a rotational direction of the bale within the baling chamber during formation. The starter roll is moveable during bale formation in a direction at least partially directed toward a central transverse axis of the baling chamber to maintain a constant inward deformation distance into an exterior circumferential surface of the bale as the diametric size of the bale increases during formation.

17 Claims, 6 Drawing Sheets

(56) References Cited

U.S. PATENT DOCUMENTS

| 9,529,364 | B2 | 12/2016 | Foster et al. |
| 9,545,048 | B2 | 1/2017 | Pickett et al. |
| 9,642,305 | B2 | 5/2017 | Nykamp et al. |
| 9,861,040 | B2 | 1/2018 | Bonefas |
| 9,873,570 | B2 | 1/2018 | Van Mill et al. |
| 10,019,790 | B2 | 7/2018 | Bonefas et al. |
| 10,028,441 | B2 | 7/2018 | Van Mill et al. |
| 10,765,063 | B2 | 9/2020 | Van Mill et al. |
| 11,008,177 | B2 | 5/2021 | Banthia et al. |
| 11,272,667 | B2 | 3/2022 | Bump et al. |
| 11,457,562 | B2 | 10/2022 | Van Mill et al. |
| 12,369,528 | B2 * | 7/2025 | Dybro ................. A01F 15/0883 |
| 12,439,857 | B2 * | 10/2025 | Wigdahl ............. A01F 15/0715 |
| 2012/0099948 | A1 | 4/2012 | Bump et al. |
| 2014/0277963 | A1 | 9/2014 | Van Mill et al. |
| 2014/0286731 | A1 | 9/2014 | Van Mill et al. |
| 2015/0101519 | A1 | 4/2015 | Blackwell et al. |
| 2018/0242521 | A1 | 8/2018 | Thomson et al. |
| 2018/0244477 | A1 | 8/2018 | Stilborn et al. |
| 2019/0098836 | A1 * | 4/2019 | Kraus .................... G01G 19/08 |
| 2019/0322461 | A1 | 10/2019 | Banthia et al. |
| 2021/0068348 | A1 | 3/2021 | Wigdahl et al. |
| 2021/0294337 | A1 | 9/2021 | Van Mill et al. |
| 2022/0071078 | A1 | 3/2022 | Boyer et al. |
| 2022/0228902 | A1 | 7/2022 | Von Muenster |
| 2022/0228906 | A1 | 7/2022 | Von Muenster |
| 2022/0369564 | A1 | 11/2022 | Wigdahl et al. |
| 2023/0093038 | A1 | 3/2023 | Schlimgen et al. |
| 2024/0315174 | A1 * | 9/2024 | Jadhao ............... A01F 15/0833 |

FOREIGN PATENT DOCUMENTS

| EP | 1214874 A1 | 6/2002 |
| EP | 2245916 B1 | 2/2013 |
| WO | WO 2018102524 A1 | 6/2018 |
| WO | WO 2022036114 A1 | 2/2022 |

* cited by examiner

ROUND BALER WITH POSITION ADJUSTABLE STARTER ROLL

TECHNICAL FIELD

The disclosure generally relates to a round baler.

BACKGROUND

There are a wide variety of different types of machines that generate bales of material. Such balers can bale material like hay, straw, silage, cotton, recycled paper products, etc. One type of machine produces a bale having a cylindrical shape. Such a machine is often referred to as a round baler. One configuration of round baler includes a plurality of forming belts forming a baling chamber and running in an endless loop about a plurality of rollers. Some of the rollers are repositioned during the formation of the bale to increase the size of the baling chamber to accommodate larger diameters. A round baler of this configuration is often referred to as a variable chamber round baler.

The forming belts are arranged about the plurality of rollers to define the baling chamber having an inlet. The crop material is introduced into the baling chamber through the inlet. The inlet extends across a width of the baling chamber, and is bounded by an upper inlet roller and a lower inlet roller, each of which support the forming belts. In order to aid in the initial formation of the bale, a starter roll may be positioned within the inlet, proximate the upper inlet roller, between the upper inlet roller and the lower inlet roller. The starter roll is rotated about a respective axis of rotation to induce rotation of the crop material in the baling chamber during initial bale formation.

The density of the crop material forming the round bale is important. Higher densities increase a weight to size ratio, thereby increasing efficiency, improve stackability, improve appearance, etc. Additionally, increasing the density of the crop material forming the bale reduces entrapped air within the bale, which may be important for some types of crop storage, e.g., silage. It is difficult to increase density of a bale after formation. Accordingly, it is important to induce higher densities of the crop material during formation of the bale.

SUMMARY

A round baler is provided. The round baler includes a frame and a forming belt defining a baling chamber having an inlet through which crop material enters into the baling chamber. The baling chamber is operable to form crop material into a bale having a cylindrical shape. A belt tensioning system includes a plurality of fixed rollers rotatably supported by the frame, a tension arm moveable relative to the frame, and a plurality of moveable rollers rotatably supported by and moveable with the tension arm. The plurality of fixed rollers and the plurality of moveable rollers support the forming belt in a circuitous path. The tension arm and the moveable rollers move relative to the frame for maintaining tension in the forming belt while allowing a diametric size of the bale to increase during formation. A starter roll is positioned immediately upstream of the inlet relative to a rotational direction of the bale within the baling chamber during formation. The starter roll is moveable relative to the frame in a direction at least partially directed toward a central transverse axis of the baling chamber.

In one aspect of the disclosure, the plurality of fixed rollers may include an upper inlet roller supporting the forming belt along an upper edge of the inlet, and a lower inlet roller supporting the forming belt along a lower edge of the inlet. The starter roll is positioned proximate the upper inlet roller, between the upper inlet roller and the lower inlet roller.

In one aspect of the disclosure, the starter roll is moveable between a first radial position and a second radial position relative to the central transverse axis. The starter roll may be positioned in the first radial position for forming the bale having a first diametric size. The starter roll may be positioned in the second radial position relative to the central transverse axis for forming the bale having a second diametric size that is larger than the first diametric size.

In one aspect of the disclosure, the round baler may further include a torque transmitting device interconnecting the upper inlet roller and the starter roll. The torque transmitting device is configured for transmitting torque from the upper inlet roller to the starter roll to rotate the starter roll about a respective axis of rotation of the starter roll. The torque transmitting device may include, but is not limited to, an endless chain engaging respective sprockets on the upper inlet roller and the starter roll, an endless belt engaging respective pulleys on the upper inlet roller and the starter roll, or a drive shaft interconnecting the upper inlet roller and the starter roll.

In one aspect of the disclosure, the starter roll is parallel with the central transverse axis of the baling chamber and extends across a width of the baling chamber. Additionally, the starter roll does not support the forming belt.

In one aspect of the disclosure, the round baler may further include a bracket attached to the starter roll and rotatably attached to the frame. The bracket and the starter roll are rotatable relative to the frame to move the starter roll in the direction at least partially directed toward the central transverse axis of the baling chamber. In one aspect of the disclosure, the starter roll is moveable along an arcuate path between a radially outermost position and a radial innermost position. In one implementation, the bracket and the starter roll are pivotable about an axis of rotation of the upper inlet roller, whereby a separation distance between the starter roll and the upper inlet roller may be maintained during movement of the starter roll.

In one aspect of the disclosure, the round baler may further include an actuator interconnecting the frame and one of the starter roll and the bracket. The actuator is operable to move the bracket and the starter roll in the direction at least partially directed toward the central transverse axis of the baling chamber. The actuator may include, but is not limited to, one or a combination of a hydraulic cylinder operable to extend and/or retract in response to hydraulic pressure, an electric linear actuator operable extend and/or retract in response to an electrical signal, a biasing device, such as but not limited to a spring, a rotary actuator operable to generate a rotational output, etc.

In one aspect of the disclosure, the movement of the starter roll between the radially outermost position and the radially innermost position is configured to maintain a minimum radially inward deformation distance of an exterior circumferential surface of the bale as the diametric size of the bale increases during formation. As the diametric size of the bale increases during formation, a relative position between the exterior circumferential surface of the bale and the radially outermost position of the starter roll changes. As the diameter of the bale increases, the exterior circumferential surface of the bale moves away from an axis of rotation of the starter roll when disposed in the radially outermost position. By moving the starter roll inward toward the central transverse axis as the diametric size of the bale increases, the minimum radially inward deformation distance of the exterior circumferential surface of the bale caused by the starter roll during initial formation may be maintained as the diametric size of the bale increases, thereby providing consistent density throughout the cross section of the bale.

In one aspect of the disclosure, the round baler includes a controller including a processor and a memory having bale density control algorithm stored thereon. The processor is operable to execute the bale density control algorithm to control movement of the starter roll in the direction at least partially directed toward the central transverse axis of the baling chamber. The controller may control movement of the starter roll based on the diametric size of the bale during formation.

In one aspect of the disclosure, the processor is operable to execute the bale density control algorithm to determine a diametric size of the bale within the baling chamber during formation. The controller may determine the diametric size using data from a bale size sensor. The bale size sensor may include, but is not limited to, a position sensor sensing data related to a position of the forming belt and/or one or more components of the belt tensioning system. For example, the position sensor may include, but is not limited to, a potentiometer coupled to the tension arm of the belt tensioning system. In other implementations, the sensor may include an optical sensor operable to capture images of the forming belt and/or the belt tensioning system and determine a position from the images.

In aspect of the disclosure, the processor may be operable to execute the bale density control algorithm to detect a plug condition preventing crop movement into the baling chamber. In response to detection of the plug condition the controller may move the starter roll to a radial innermost position thereof to increase a throat size of the inlet for alleviating the plug condition.

In one aspect of the disclosure, the processor may be operable to execute the bale density control algorithm to determine a mass flow rate of the crop material entering the baling chamber. The controller may control movement of the starter roll in the direction at least partially directed toward the central transverse axis of the baling chamber based on the mass flow rate of crop material entering the baling chamber.

In one aspect of the disclosure, the frame includes a housing having a side wall at least partially forming the baling chamber. The side wall may define a slot therethrough, with the starter roll extending through the slot and moveable within the slot relative to the housing. The round baler may further include a shield attached to and movable with one of the bracket and the starter roll. The shield is shaped to cover the slot throughout a full range of movement of the starter roll to prevent movement of crop material through the slot.

A method of forming a bale is also provided. The method includes providing a round baler to include a frame, a forming belt defining a baling chamber having an inlet through which crop material enters into the baling chamber. The baling chamber is operable to form crop material into a bale having a cylindrical shape. The round baler is further provided to include a belt tensioning system having a plurality of fixed rollers rotatably supported by the frame, a tension arm moveable relative to the frame, and a plurality of moveable rollers rotatably supported by and moveable with the tension arm. The plurality of fixed rollers and the plurality of moveable rollers support the forming belt in a circuitous path. the tension arm and the moveable rollers move relative to the frame for maintaining tension in the forming belt while allowing a diametric size of the bale to increase during formation. The round baler further includes a starter roll positioned immediately upstream of the inlet relative to a rotational direction of the bale within the baling chamber during formation. The method further includes positioning the starter roll in a radially outermost position, and feeding crop material through the inlet into the baling chamber, whereby movement of the forming belt along the circuitous path causes rotation of the crop material in the rotational direction thereby forming the crop material into a bale having cylindrical shape defining a diameter, with the starter roll radially deforming an exterior circumferential surface of the bale inward toward a center of the bale a minimum deformation distance when the bale exhibits a first initial diameter. Crop material is continuously fed through the inlet into the baling chamber to increase the diameter of the bale within the baling chamber from the first initial diameter to a second diameter that is greater than the first initial diameter. The starter roll is moved relative to the frame from the radially outermost position in a direction at least partially directed toward a central transverse axis of the baling chamber while the diameter of the bale increases from the first initial diameter to the second diameter to substantially maintain the minimum deformation distance of the starter roll intrusion into the bale.

In one aspect of the disclosure, the method of forming the bale may include detecting a plug condition in the round baler preventing crop movement into the baling chamber, and moving the starter roll to a radial innermost position thereof in response to detection of the plug condition to increase a throat size of the inlet for alleviating the plug condition.

Accordingly, the round baler described herein is operable to move the starter roll radially inward during bale formation to substantially maintain the minimum deformation distance of the starter roll intrusion into the bale as the diametric size of the bale increases. The minimum deformation distance locally compresses the crop material contacting the starter roll inward toward the bale center immediately prior to the inlet. Compression of the bale by the starter roll in this region allows new crop to be introduced into the inward deformation distance, thereby increasing bale density. The starter roll is moved radially inward to maintain the minimum deformation distance or intrusion into the bale as the diametric size of the bale increases because the relative position of the exterior circumferential surface of the bale relative to the starter roll changes as the diametric size of the bale increases. By moving the starter roll inward during bale formation, the minimum deformation distance may be maintained throughout the full formation of the bale, thereby providing a consistently higher density bale throughout the entire cross section of the bale.

The above features and advantages and other features and advantages of the present teachings are readily apparent from the following detailed description of the best modes for carrying out the teachings when taken in connection with the accompanying drawings.

DETAILED DESCRIPTION

Figure 1:
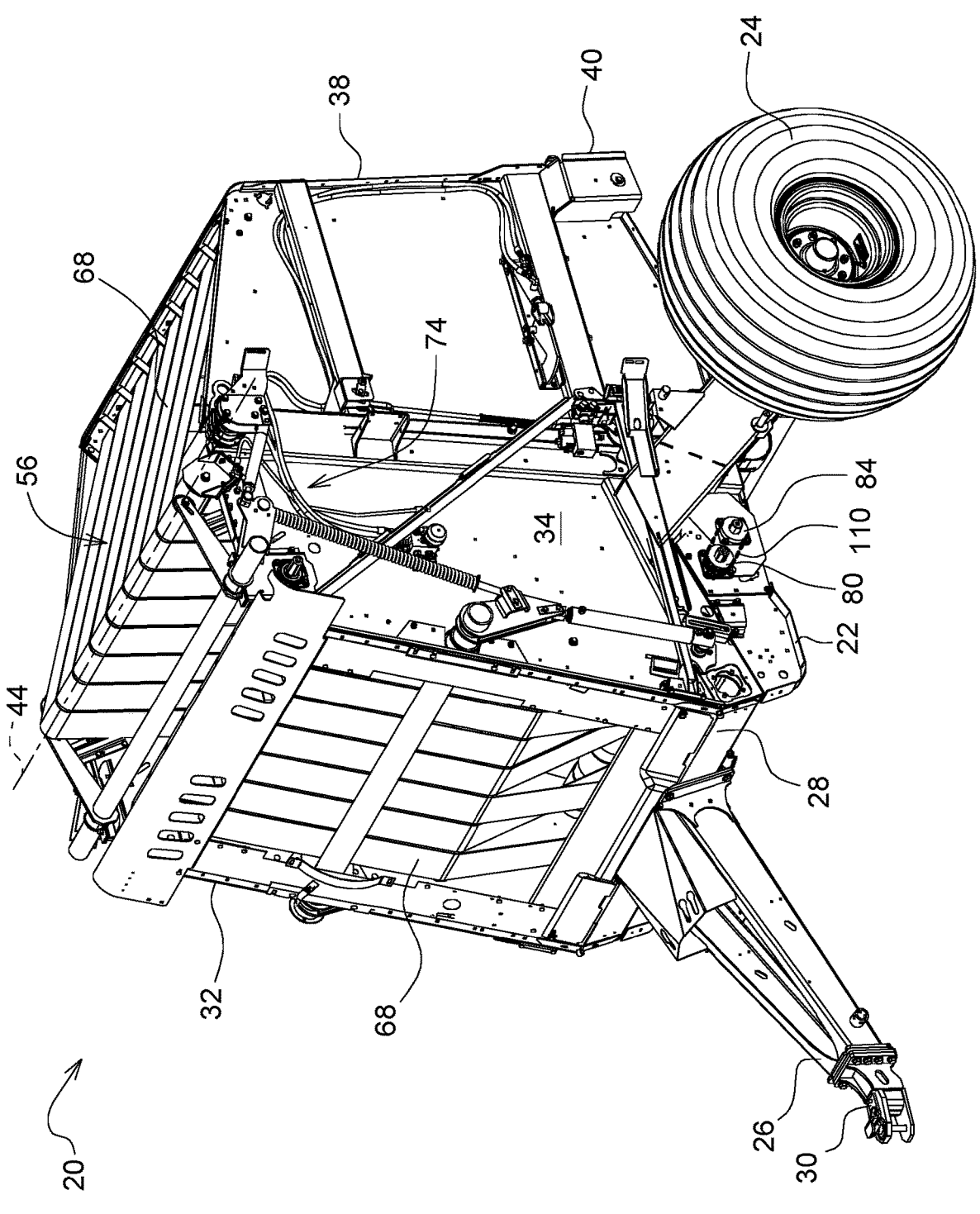
FIG. 1 is a schematic perspective view of a round baler.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a round baler is generally shown at 20. Referring to the FIGS. 1 and 2, the round baler 20 includes a frame 22. One or more ground engaging elements 24, such as but not limited to one or more wheels and/or tracks, are attached to and rotatably supported by the frame 22. A tongue 26 may be coupled to the frame 22 at a forward end 28 of the frame 22. A hitch arrangement 30 may be included with the tongue 26. The hitch arrangement 30 may be used to attach the round baler 20 to a traction unit, such as but not limited to an agricultural tractor. In other embodiments, the round baler 20 may be self-propelled, in which case the traction unit and the round baler 20 are configured as a single, self-propelled vehicle.

The round baler 20 includes a housing 32. The housing 32 is attached to and supported by the frame 22. The housing 32 may include one or more side walls 34 or panels that at least partially enclose and/or define an interior region 36. The round baler 20 further includes a gate 38. The gate 38 may include one or more walls or panels that at least partially enclose and/or define the interior region 36. As such, the housing 32 and the gate 38 cooperate to define the interior region 36 therebetween.

The gate 38 is attached to and rotatably supported by the housing 32. The gate 38 is positioned adjacent a rearward end 40 of the frame 22 relative to a direction of travel 42 of the round baler 20 while gathering crop material, and is pivotably moveable about a gate rotation axis 44. The gate rotation axis 44 is generally horizontal and perpendicular to a central longitudinal axis 46 of the frame 22. The central longitudinal axis 46 of the round baler 20 extends between the forward end 28 and the rearward end 40 of the round baler 20. The gate 38 is moveable between a closed position for forming a bale 58 within the interior region 36, and an open position for discharging the bale 58 from the interior region 36 onto a ground surface.

The round baler 20 includes a pick-up 48 disposed proximate the forward end 28 of the frame 22. The pick-up 48 gathers crop material from the ground surface and directs the gathered crop material toward and into an inlet 50 of a baling chamber 52 disposed within the interior region 36. The pickup may include, but is not limited to tines, forks, augers, conveyors, baffles, etc., for gathering and moving the crop material. The round baler 20 may be equipped with a pre-cutter (not shown), disposed between the pickup and the inlet 50. As such, the pre-cutter is disposed downstream of the pickup and upstream of the inlet 50 relative to movement of the crop material. As is understood by those skilled in the art, the pre-cutter cuts or chops the crop material into smaller pieces.

The round baler 20 may include a wrap system 54. The wrap system 54 is operable to wrap the bale 58 with a wrap material inside the baling chamber 52. Once the bale 58 is formed to a desired size, the wrap system 54 feeds the wrap material into the baling chamber 52 to wrap the bale 58 and thereby secure the crop material in a tight package and maintain the desired shape of the bale 58. The wrap material may include, but is not limited to, a twine, a net mesh, or a solid plastic wrap.

Figure 3:
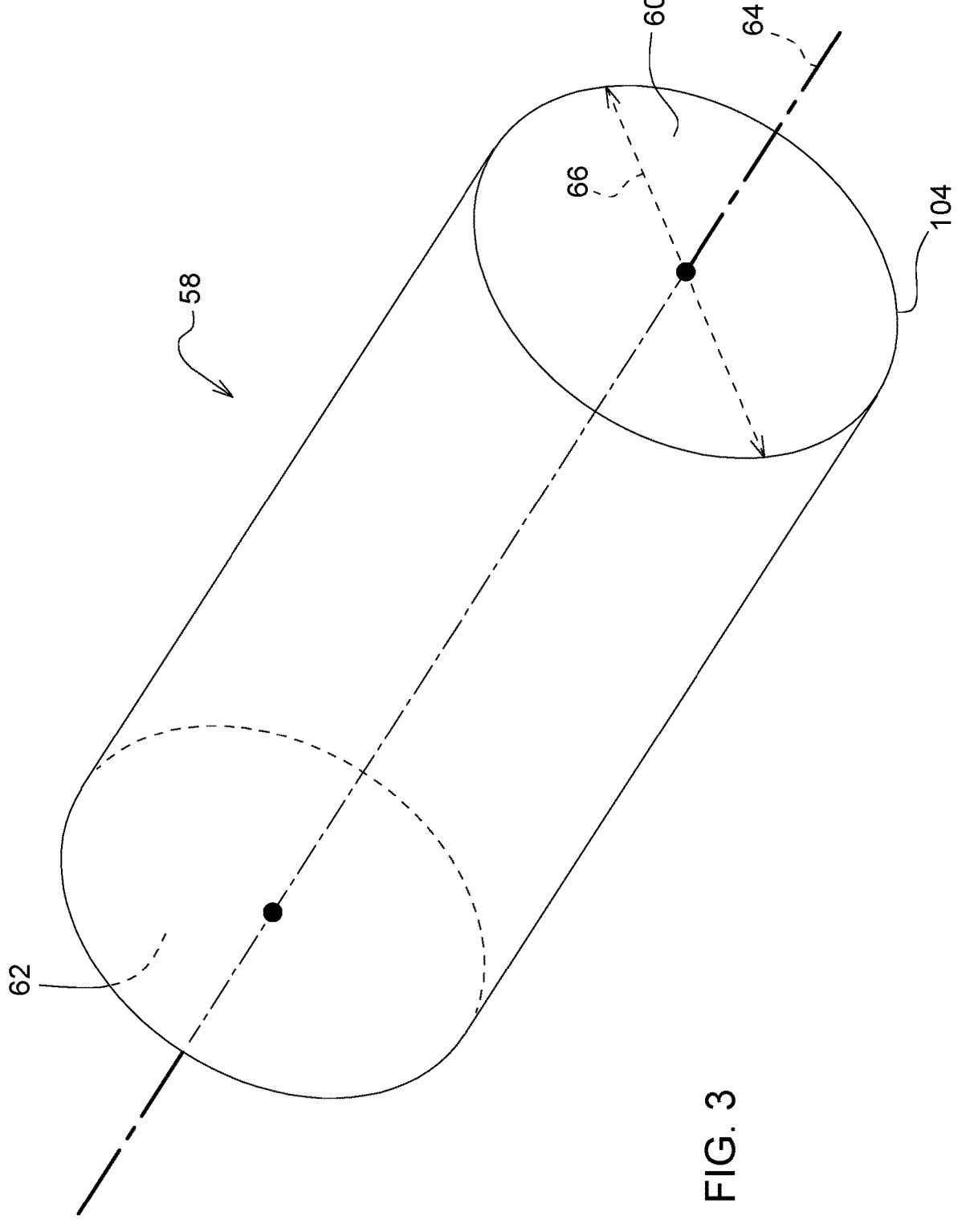
FIG. 3 is a schematic perspective view of a bale.

A bale formation system 56 is disposed within the interior region 36 and is configured to form the bale 58 to have a cylindrical shape. Referring to FIG. 3, the cylindrical shape of the bale 58 includes a first circular end face 60 and a second circular end face 62 disposed at opposing ends of the bale 58 relative to a centerline 64 of the cylindrical shape. The centerline 64 of the bale 58 is generally located and extends through respective diametric centers of the first circular end face 60 and the second circular end face 62. The first circular end face 60 and the second circular end face 62 each define a diametric size 66 of the bale 58, i.e., a diameter 66 of the cylindrical shape of the bale 58. The centerline 64 of the cylindrical shape is generally parallel with the gate rotation axis 44 and perpendicular to the central longitudinal axis 46 during formation of the bale 58 by the bale formation system 56, within the baling chamber 52.

Figure 2:
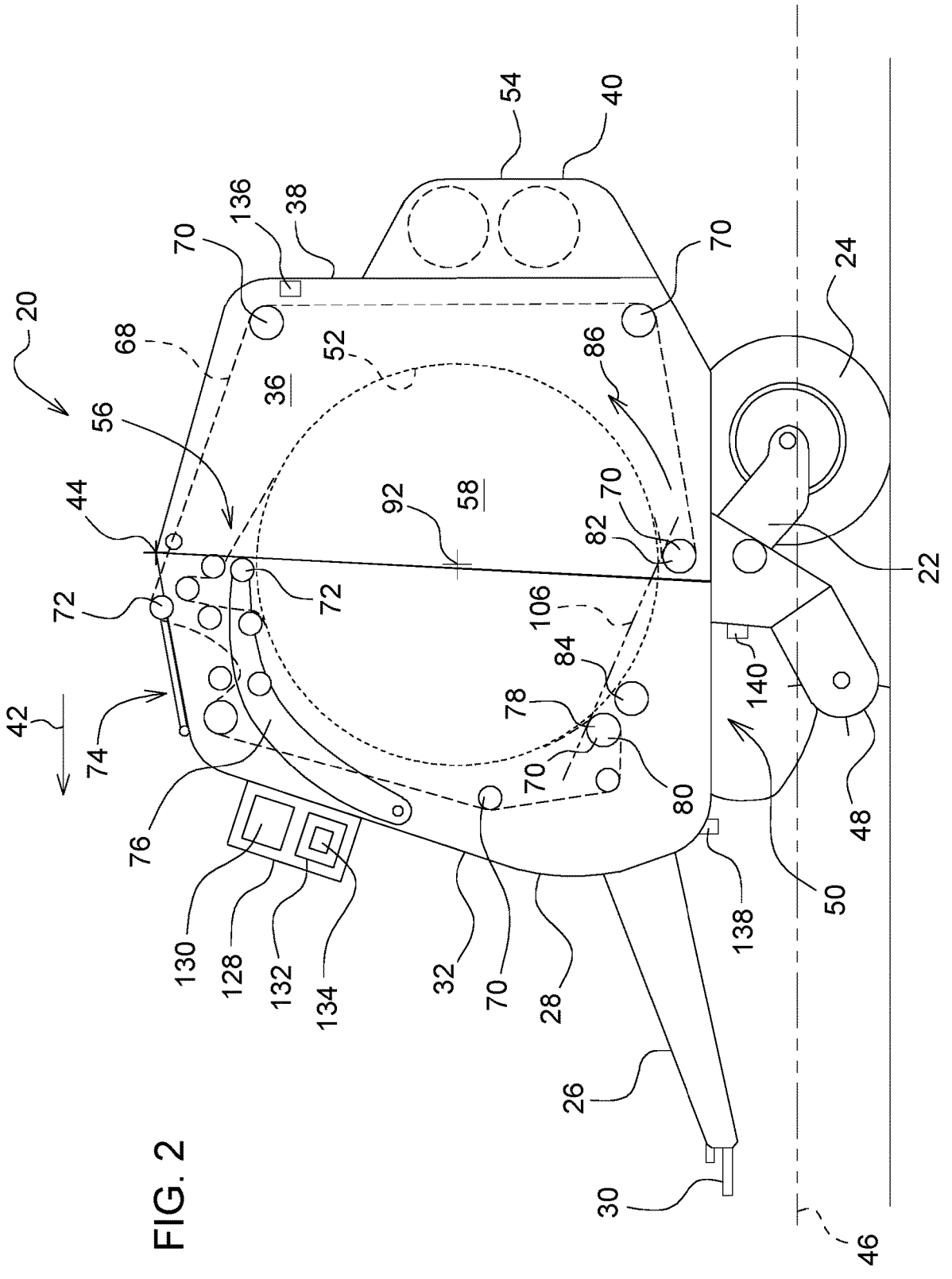
FIG. 2 is a schematic side view of the round baler.

Referring to FIG. 2, the bale formation system 56 may be configured as a variable chamber baler. The variable chamber baler includes at least one, and may include a plurality of longitudinally extending side-by-side forming belts 68 that are supported by a plurality of fixed rollers 70 and a plurality of moveable rollers 72. The fixed rollers 70 and the moveable rollers 72 extend transverse to the central longitudinal axis 46 of the frame 22. The forming belts 68 are arranged about the fixed rollers 70 and the moveable rollers 72 to define the baling chamber 52 and the inlet 50 into the baling chamber 52. The forming belts 68 move in an endless loop along a circuitous path to form crop material into the bale 58 having the cylindrical shape. The bale 58 is formed by the forming belts 68 and one or more side walls 34 of the housing 32 and gate 38. Movement of the gate 38 into the open position simultaneously moves the forming belts 68 clear of the formed bale 58 and allows the formed and wrapped bale 58 to be discharged through the rearward end 40 of the baling chamber 52.

As is understood by those skilled in the art, a position and/or orientation of the forming belts 68 is controlled to vary the size of the baling chamber 52. The round baler 20 includes a belt tensioning system 74. The belt tensioning system 74 includes the plurality of fixed rollers 70, the plurality of moveable rollers 72, and a tension arm 76. The fixed rollers 70 are rotatably supported by the frame 22. The tension arm 76 supports the moveable rollers 72 and is moveable relative to the frame 22. The moveable rollers 72 are rotatably supported by and moveable with the tension arm 76. The fixed rollers 70 and the moveable rollers 72 support the forming belt 68 along its circuitous path. The tension arm 76 and the moveable rollers 72 move relative to the frame 22 to change the shape of the baling chamber 52, thereby allowing the diametric size 66 of the bale 58 to increase while maintaining tension in the forming belt 68 during formation of the bale 58.

At least one of the fixed rollers 70 may include a drive roller 78. The drive roller 78 is operable to drive, rotate, and/or move the forming belts 68 in the endless loop through frictional engagement between the forming belts 68 and the drive roller 78. In the example implementation shown in the Figures and described herein, the plurality of fixed rollers 70 includes an upper inlet roller 80 and a lower inlet roller 82. The upper inlet roller 80 supports the forming belt 68 along an upper and forward edge of the inlet 50. The upper inlet roller 80 may further be configured as the drive roller 78. The lower inlet roller 82 supports the forming belt 68 along a lower and rearward edge of the inlet 50.

In the example implementation shown in the figures and described herein, in which the bale formation system 56 includes the variable chamber baler, the crop material is directed through the inlet 50 and into the baling chamber 52, whereby the forming belts 68 roll the crop material in a spiral fashion into the bale 58 having the cylindrical shape. The forming belts 68 apply a constant pressure to the crop material as the crop material is formed into the bale 58. The tension arm 76 continuously moves the moveable rollers 72, and thereby the forming belts 68, radially outward relative to the centerline 64 of the cylindrical bale 58 as the diameter 66 of the bale 58 increases to obtain the desired density of the crop material.

As shown in FIG. 2, the bale formation system 56 further includes a starter roll 84. The starter roll 84 is positioned immediately upstream of the inlet 50 relative to a rotational direction 86 of the bale 58 within the baling chamber 52 during formation of the bale 58. The starter roll 84 is generally parallel with the central transverse axis 92 and extends across a width of the baling chamber 52. The starter roll 84 does not support and/or position the forming belts 68. In the example implementation shown in the Figures and described herein, the starter roll 84 is positioned proximate and near the upper inlet roller 80, within the inlet 50 and between the upper inlet roller 80 and the lower inlet roller 82.

The starter roll 84 is rotatable about an axis of rotation 88 of the starter roll 84. The starter roll 84 is also moveable relative to the frame 22 in a direction 90 that is perpendicular to the axis of rotation 88 of the starter roll 84. As such the starter roll 84 is moveable in the direction 90 that is at least partially directed toward a central transverse axis 92 of the baling chamber 52. The central transverse axis 92 of the baling chamber 52 is arranged perpendicular to the central longitudinal axis 46 of the frame 22, and extends across the width of the baling chamber 52 at an approximate center of the interior region 36 of the round baler 20.

Figure 4:
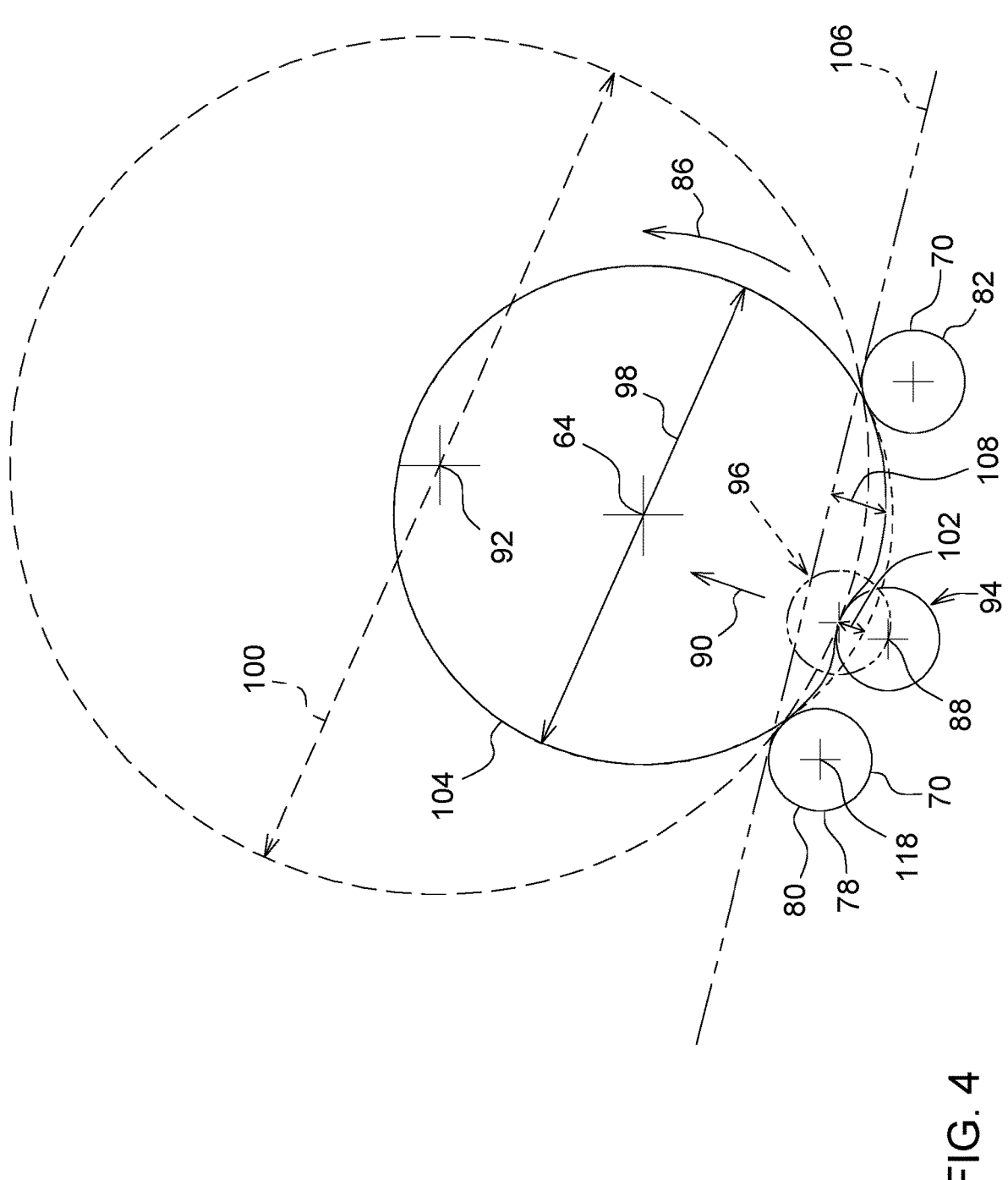
FIG. 4 is a schematic enlarged partial cross sectional view of the round baler, showing a starter roll in a first radial position and a bale having a first diametric size.
Figure 5:
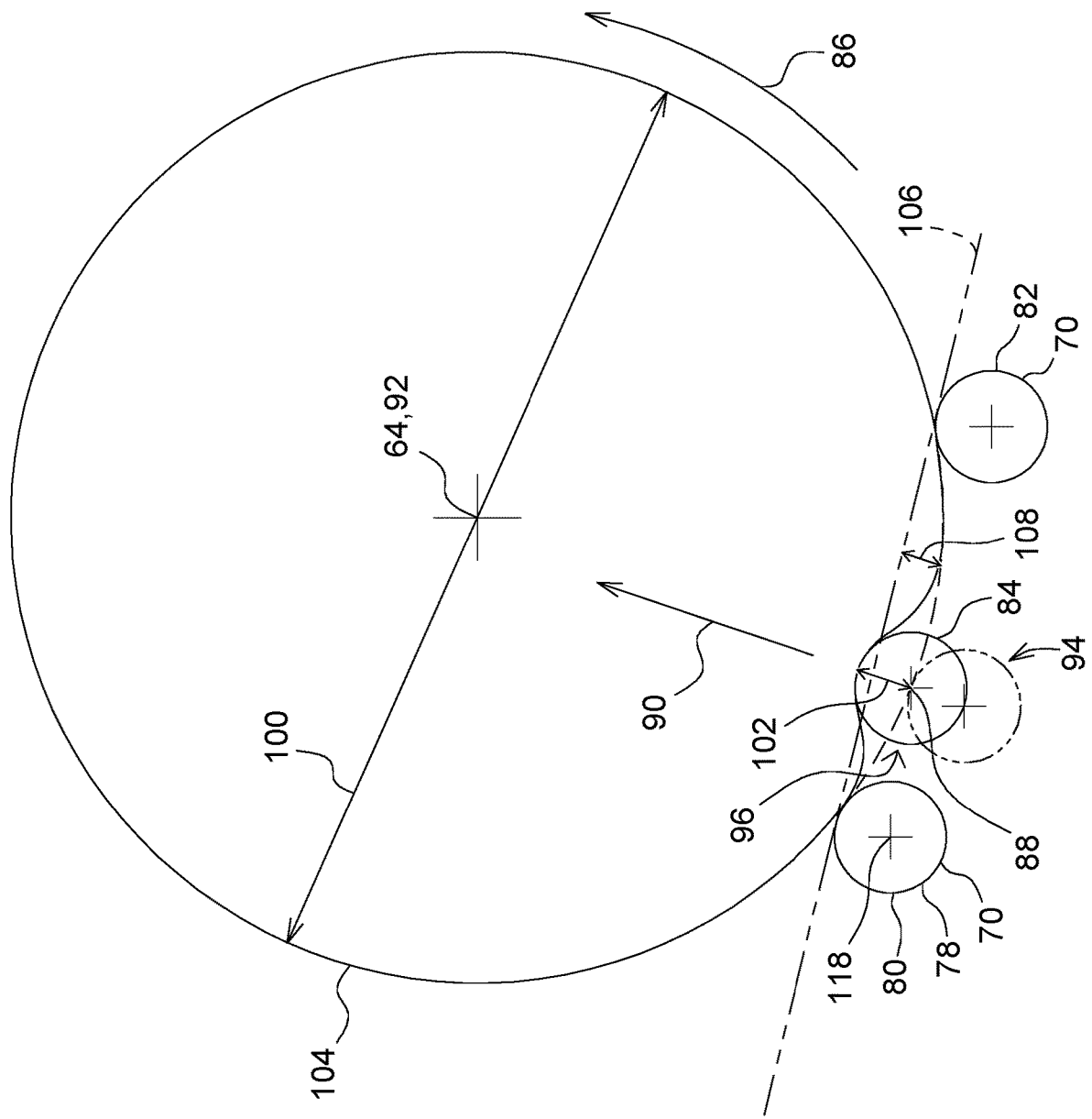
FIG. 5 is a schematic enlarged partial cross sectional view of the round baler, showing the starter roll in a second radial position and the bale having a second diametric size.

Referring to FIGS. 4 and 5, the starter roll 84 is moveable between a first radial position 94 and a second radial position 96 relative to the central transverse axis 92. As shown in FIG. 4, the first radial position 94 may be defined as a radially outermost position of the starter roll 84 relative to the central transverse axis 92. As shown in FIG. 5, the second radial position 96 may be defined as a radially innermost position of the starter roll 84 relative to the central transverse axis 92. As shown in FIG. 4, the first radial position 94 of the starter roll 84 is operable to form the bale 58 with the bale 58 exhibiting a first diametric size 98. As shown in FIG. 5, the second radial of the starter roll 84 is operable to form the bale 58 with the bale 58 exhibiting a second diametric size 100. The second diametric size 100 is larger than the first diametric size 98. For example, the first diametric size 98 may be a diametric size 66 of the bale 58 during initial bale 58 formation, whereas the second diametric size 100 may be a diametric size 66 of the bale 58 at completion.

In one implementation, the starter roll 84 may move continuously between the first radial position 94 and the second radial position 96, i.e., through an infinite number of positions between the first radial position 94 and the second radial position 96, as the diametric size 66 of the bale 58 increases during formation. In another implementation, the starter roll 84 may move between a plurality of discrete positions between the first radial position 94 and the second radial position 96 as the diametric size 66 of the bale 58 increases during formation.

The movement of the starter roll 84 between the first radial position 94 and the second radial position 96 is configured to maintain a minimum radially inward deformation distance 102 of an exterior circumferential surface 104 of the bale 58 as the diametric size 66 of the bale 58 increases during formation. The relative position of the exterior circumferential surface 104 of the bale 58 relative to the starter roll 84 changes as the diametric size 66 of the bale 58 increases. This is because the exterior circumferential surface 104 of the bale 58 rests on the upper inlet roller 80 and the lower inlet roller 82 during formation. The upper inlet 50 roll and the lower inlet roller 82 define two points on the exterior circumferential surface 104 of the bale 58 forming a chord 106 therebetween. As is understood by those skilled in the art, a "chord" is defined as a straight line joining two points on the circumference of a circle. Because the upper inlet roller 80 and the lower inlet roller 82 are fixed rollers 70, i.e., fixed in position relative to the frame 22, neither the upper inlet roller 80 nor the lower inlet roller 82 move during formation of the bale 58. As such, as the radius of the bale 58 increases during formation, a radial distance 108 between the chord 106, defined between the fixed positions of the upper inlet roller 80 and the lower inlet roller 82, and the exterior circumferential surface 104 of the bale 58, decreases. Because the starter roll 84 is positioned between the upper inlet roller 80 and the lower inlet roller 82, the relative position of the starter roll 84 when disposed in the first radial position 94, relative to the exterior circumferential surface 104 of the bale 58, also decreases.

The minimum deformation distance 102 locally compresses the crop material contacting the starter roll 84 inward toward the bale 58 center immediately prior to the inlet 50. Compression of the bale 58 by the starter roll 84 in this region allows new crop to be introduced into the inwardly deformed region of the bale 58 immediately downstream of the starter roll 84, thereby increasing bale 58 density. The starter roll 84 is moved radially inward relative to the frame 22 to maintain the minimum deformation distance 102 or intrusion into the bale 58 as the diametric size 66 of the bale 58 increases. By moving the starter roll 84 inward during bale 58 formation, the minimum deformation distance 102 may be maintained throughout the full formation of the bale 58, thereby providing a consistently higher density bale 58 throughout the entire cross section of the bale 58.

The starter roll 84 may be rotatably driven to aid initial formation of the crop material into the cylindrical shape of the bale 58. In one implementation, as shown in FIG. 1, the round baler 20 may include a torque transmitting device 110 interconnecting the upper inlet roller 80 and the starter roll 84. As noted above, the upper inlet roller 80 may be configured as the drive roller 78 for rotating the forming belts 68. The torque transmitting device 110 may be configured for transmitting torque from the upper inlet roller 80 to the starter roll 84 to rotate the starter roll 84 about the axis of rotation 88 of the starter roll 84. In one example implementation, the torque transmitting device 110 may include, but is not limited to, an endless chain engaging respective sprockets on the upper inlet roller 80 and the starter roll 84, an endless belt engaging respective pulleys on the upper inlet roller 80 and the starter roll 84, or a drive shaft interconnecting the upper inlet roller 80 and the starter roll 84. It should be appreciated that torque may be communicated between the upper inlet roller 80 and the starter roll 84 in some other manner not described herein. Additionally, it should be appreciated that the starter roll 84 may be directly coupled to a motor, for example, and electrical motor, for direct drive independently of the upper inlet roller 80.

Figure 6:
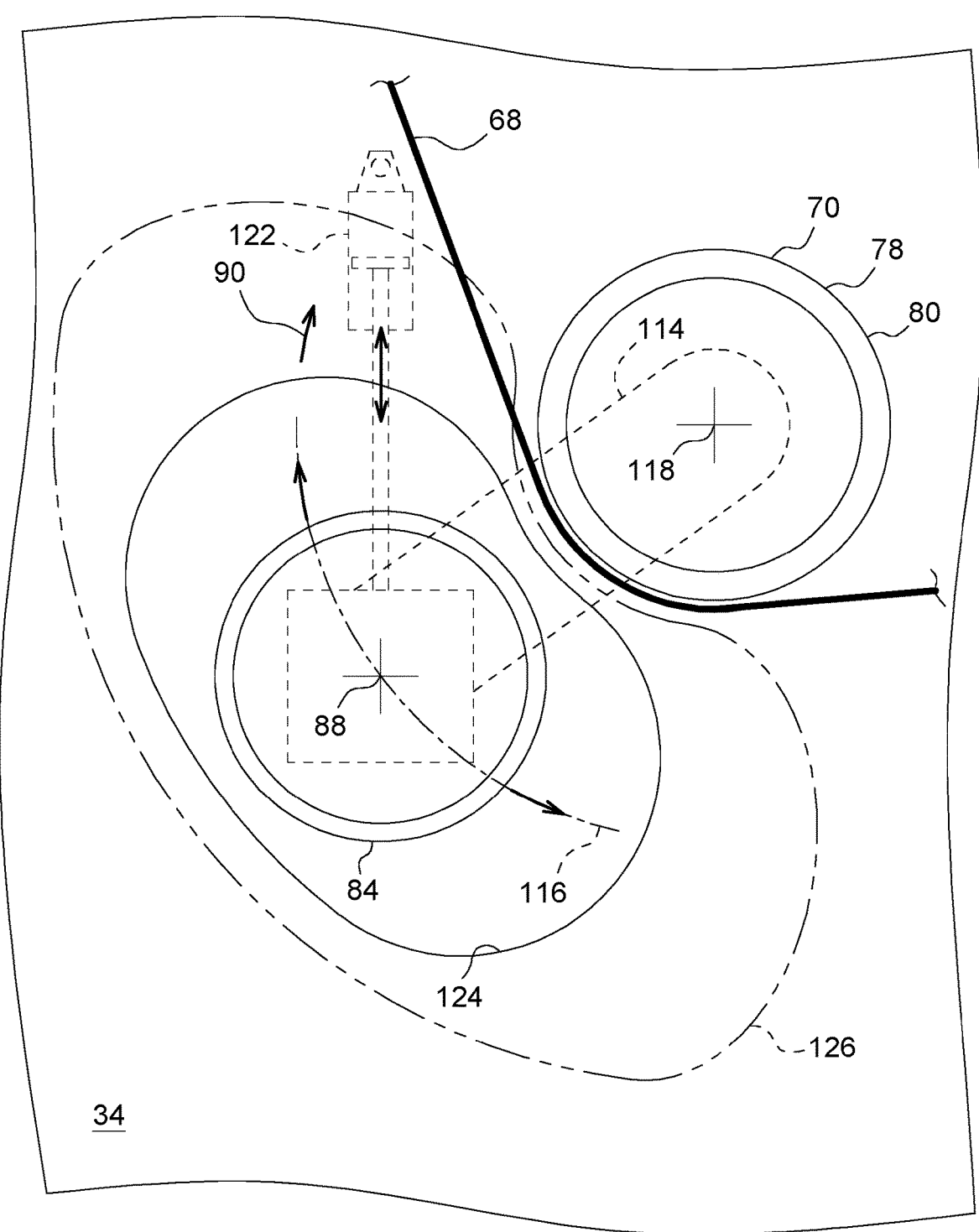
FIG. 6 is a schematic enlarged side view of the round baler showing the a bracket connecting the starter roll and an upper inlet roller.

Referring to FIG. 6, in one implementation of the disclosure, the round baler 20 may include a bracket 114 interconnecting the frame 22 and the starter roll 84. The bracket 114 may be attached to the starter roll 84 at one end via a bearing or other rotational interconnecting device. The bracket 114 may further be rotatably attached to the frame 22 at an opposing end thereof. As such, the bracket 114 and the starter roll 84 may be rotatable relative to the frame 22 to move the starter roll 84 between the first radial position 94 and the second radial position 96. In doing so, the starter roll 84 may move along an arcuate path 116 between the first radial position 94, i.e., the radially outermost position, and the second radial position 96, i.e., the radially innermost position.

In one implementation of the disclosure, the bracket 114 and the starter roll 84 may be pivotable about an axis of rotation 118 of the upper inlet roller 80. By rotating the bracket 114 about the axis of rotation 118 of the upper inlet roller 80, a separation distance 120 between the starter roll 84 and the upper inlet roller 80 may be maintained during movement of the starter roll 84 between the first radial position 94 and the second radial position 96. This may be beneficial in implementations in which the starter roll 84 is positioned and operable to clear debris from the forming belts 68 as the starter roll 84 and forming belts 68 move past each other in close proximity.

The round baler 20 may further include an actuator 122. The actuator 122 interconnects the frame 22 and one of the starter roll 84 and the bracket 114. The actuator 122 is operable to move the bracket 114 and the starter roll 84 in the direction 90 at least partially directed toward the central transverse axis 92 of the baling chamber 52. The actuator 122 may include, but is not limited to, one or a combination of a hydraulic cylinder operable to extend and/or retract in response to hydraulic pressure, an electric linear actuator 122 operable extend and/or retract in response to an electrical signal, a biasing device, such as but not limited to a spring, a rotary actuator 122 operable to generate a rotational output, etc. The actuator 122 may be remotely operated, e.g., via a hydraulic or electric control signal, or may be manually operated by an operator, e.g., via turning a jack screw or manipulating a lever. It should be appreciated that the actuator 122 may be configured differently than the example implementations described herein.

As noted above, the round baler 20 includes the housing 32 having the side wall 34 at least partially forming the baling chamber 52. The side wall 34 may further define a slot 124 therethrough. The starter roll 84 may at least partially extend through the slot 124. Because the side wall 34 is stationary relative to the frame 22, the starter roll 84 may be moveable within the slot 124 relative to the housing 32 when moving between the first radial position 94 and the second radial position 96. In order to prevent crop material from exiting the baling chamber 52 through the slot 124, the round baler 20 may include a shield 126 attached to and movable with one of the bracket 114 and the starter roll 84. The shield 126 may be shaped to cover the slot 124 throughout a full range of movement of the starter roll 84 between the first radial position 94 and the second radial position 96.

As shown in FIG. 1, the round baler 20 may further include a controller 128. The controller 128 may be configured for controlling movement of the starter roll 84 between the first radial position 94 and the second radial position 96. While the controller 128 is generally described herein as a singular device, it should be appreciated that the controller 128 may include multiple devices linked together to share and/or communicate information therebetween. Furthermore, it should be appreciated that the controller 128 may be located on the round baler 20 or located remotely from the round baler 20.

The controller 128 may alternatively be referred to as a computing device, a computer, a control unit, a control module, a module, etc. The controller 128 includes a processor 130, a memory 132, and all software, hardware, algorithms, connections, sensors, etc., necessary to manage and control the operation of the starter roll 84. As such, a method may be embodied as a program or algorithm operable on the controller 128. It should be appreciated that the controller 128 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory 132 or received via the communication capabilities) to control or communicate with one or more other components. In certain embodiments, the controller 128 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 128 may be in communication with other components on the round baler 20, such as hydraulic components, electrical components, and operator inputs within an operator station of an associated work vehicle. The controller 128 may be electrically connected to these other components by a wiring harness such that messages, commands, and electrical power may be transmitted between the controller 128 and the other components. Although the controller 128 is referenced in the singular, in alternative embodiments the configuration and functionality described herein can be split across multiple devices using techniques known to a person of ordinary skill in the art.

The controller 128 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 132 may include any non-transitory/tangible medium which participates in providing data or computer-readable instructions. The memory 132 may be non-volatile or volatile. Non-volatile media may include, for example, optical or magnetic disks and other persistent memory. Example volatile media may include dynamic random access memory (DRAM), which may constitute a main memory. Other examples of embodiments for memory 132 include a floppy, flexible disk, or hard disk, magnetic tape or other magnetic medium, a CD-ROM, DVD, and/or any other optical medium, as well as other possible memory devices such as flash memory.

The controller 128 includes the tangible, non-transitory memory 132 on which are recorded computer-executable instructions, including a bale density control algorithm 134. The processor 130 of the controller 128 is configured for executing the bale density control algorithm 134. The bale density control algorithm 134 implements a method of controlling the round baler 20 and/or forming the bale 58, described in detail below.

The method or process described herein includes providing the round baler 20 having the starter roll 84 moveable relative to the frame 22 in the direction 90 at least partially directed toward the central transverse axis 92 of the baling chamber 52, such as described above.

To initiate the process, the controller 128 may begin by positioning the starter roll 84 in the radially outermost position, e.g., the first radial position 94, such as shown in FIG. 4. The controller 128 may position the starter roll 84 in the radially outermost position by controlling the actuator 122 to move the starter roll 84 into the radially outermost position.

With the starter roll 84 positioned in the radial outermost position, an operator and/or the controller 128 may begin maneuvering the round baler 20 through a field to feed crop material through the inlet 50 and into the baling chamber 52. As described above, movement of the forming belts 68 along the circuitous path causes rotation of the crop material in the rotational direction 86 thereby forming the crop material into the bale 58 having the cylindrical shape. With the starter roll 84 disposed in the radially outermost position and with the bale 58 exhibiting and/or defining a first initial diameter 66, the starter roll 84 radially deforms the exterior circumferential surface 104 of the bale 58 inward toward the centerline 64 of the bale 58 a minimum deformation distance 102. The first initial diameter 66 may be defined as the first diametric size 98 described above. The minimum deformation distance 102 may be defined to include a distance sufficient to compress the crop material and allow new crop material to form into the deformed region immediately downstream of the starter roll 84. For example, the minimum deformation distance 102 may be defined to approximately equal a value less than or up too approximately one half (½) the diameter of the starter roll 84. However, it should be appreciated that the minimum deformation distance 102 may be defined to equal a value outside the exemplary range described herein based on the particular machine characteristics and crop properties.

The process continues feeding the crop material through the inlet 50 into the baling chamber 52 to increase the diameter 66 of the bale 58 within the baling chamber 52 from the first dimetric size 98, e.g., the initial diameter of the bale 58, to the second diametric size 100, e.g., the final or complete diameter of the bale 58. As described above, the second diametric size 100 is greater than the first diametric size 98, and may be defined as the fully complete diametric size of the bale 58.

While continuing to feed the crop material into the baling chamber 52, the controller 128 may continuously monitor and sense the current diametric size 66 of the bale 58 within the baling chamber 52. The controller 128 may sense the diametric size 66 of the bale 58 using a bale size sensor 136. The bale size sensor 136 may include a sensing device capable of sensing data related to the current size of the bale 58 within the baling chamber 52. For example, the bale size sensor 136 may include, but is not limited to, a position sensor sensing data related to a position of the forming belt 68 and/or one or more components of the belt tensioning system 74, e.g., the tension arm 76. In one implantation of the disclosure, the position sensor may include, but is not limited to, a potentiometer coupled to the tension arm 76 of the belt tensioning system 74. In other implementations, the bale size sensor 136 may include an optical sensor operable to capture images of the forming belt 68 and/or the belt tensioning system 74 and determine a position from the images. Using the data from the bale size sensor 136, the controller 128 may determine the current diametric size 66 of the bale 58 within the baling chamber 52.

The controller 128 is operable to control movement of the starter roll 84, moving in the direction 90 at least partially directed toward the central transverse axis 92 of the baling chamber 52, based on the current diametric size 66 of the bale 58 during formation. As such, the controller 128 moves the starter roll 84 relative to the frame 22 from the radially outermost position, in the direction 90 at least partially directed toward the central transverse axis 92 of the baling chamber 52, in response to and while the diameter 66 of the bale 58 increases from the first diametric size 98 to the second diametric size 100, such as shown in FIG. 5. As described above, moving the starter roll 84 radially inward concurrently with and as the diameter 66 of the bale 58 increases substantially maintains the minimum deformation distance 102 of the starter roll 84 intrusion into the bale 58.

In one aspect of the process described herein, the controller 128 may be configured to detect a plug condition. The plug condition may include an operating condition of the round baler 20 preventing movement of the crop material into the baling chamber 52. For example, the plug condition may occur when crop material becomes bound up and/or packed into the inlet 50, thereby preventing movement into the baling chamber 52. In other circumstances, the crop material may be packed up into the pick-up 48, thereby preventing the pick-up 48 from gathering additional crop material. In other circumstances, the crop material may be bound up and/or packed into the pre-cutter, thereby preventing movement into the baling chamber 52. It should be appreciated that the plug condition may be caused by some other operating condition of the round baler 20 not described herein.

The controller 128 may identify the plug condition in any suitable manner. For example, the round baler 20 may include a plug sensor 138 operable to detect data related to the plug condition. The plug sensor 138 may include, but is not limited to, a camera or other image capturing device operable to capture images of the crop material moving through the round baler 20 and into the baling chamber 52. The images may be analyzed to identify the plug condition and the location thereof. In other implementations, the plug sensor 138 may include a weight sensor operable to detect a weight grater than a threshold, thereby indicating the plug condition. It should be appreciated that the plug sensor 138 may be configured differently than the example implementation described herein.

In response to the controller 128 detecting the plug condition, the controller 128 may move the starter roll 84 to the second radial position 96 of the starter roll 84, e.g., the radial innermost position in which the starter roll 84 is positioned nearest the central transverse axis 92 of the baling chamber 52. Moving the starter roll 84 into the radial innermost position increases a throat size of the inlet 50 to a maximum value, thereby allowing and/or creating free space for the crop material to pass through the inlet 50 and thereby alleviating the plug condition. Once the plug condition has been alleviated and/or removed, the controller 128 may then return the starter roll 84 to the appropriate position to achieve the minimum radially inward deformation distance 102 into the bale 58 based on the current diametric size 66 of the bale 58.

In one aspect of the process described herein, the controller 128 may determine a mass flow rate of the crop material entering the baling chamber 52. The controller 128 may then control movement of the starter roll 84 in the direction 90 at least partially directed toward the central transverse axis 92 of the baling chamber 52 based on the mass flow rate of crop material entering the baling chamber 52. For example, during periods of higher flow rate, the controller 128 may move the starter roll 84 further inward toward the central transverse axis 92 when compared to periods of lower crop flow rate. Moving the starter roll 84 further inward would increase the deformation distance 102 of the starter roll 84 intrusion into the bale 58 beyond minimum value, thereby providing a greater region of deformation for the increased quantity of crop to fill.

The controller 128 may calculate and/or determine the mass flow rate in any suitable manner. For example, the round baler 20 may include a mass flow sensor 140 operable to detect data related to the mass flow rate of the crop material through the round baler 20. The mass flow sensor

140 may include, but is not limited to, a camera or other image capturing device operable to capture images of the crop material moving through the round baler 20 and into the baling chamber 52. The images may be analyzed over a period of time to calculate the mass flow rate. It should be appreciated that the mass flow sensor 140 may be configured differently than the example implementation described herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A round baler comprising:
   a frame;
   a forming belt defining a baling chamber having an inlet through which crop material enters into the baling chamber, wherein the baling chamber is operable to form crop material into a bale having a cylindrical shape;
   a belt tensioning system having a plurality of fixed rollers rotatably supported by the frame, a tension arm moveable relative to the frame, and a plurality of moveable rollers rotatably supported by and moveable with the tension arm, wherein the plurality of fixed rollers and the plurality of moveable rollers support the forming belt in a circuitous path and wherein the tension arm and the moveable rollers move relative to the frame for maintaining tension in the forming belt while allowing a diametric size of the bale to increase during formation;
   a starter roll positioned immediately upstream of the inlet relative to a rotational direction of the bale within the baling chamber during formation;
   wherein the starter roll is moveable relative to the frame in a direction at least partially directed toward a central transverse axis of the baling chamber;
   a controller including a processor and a memory having bale density control algorithm stored thereon, wherein the processor is operable to execute the bale density control algorithm to control movement of the starter roll in the direction at least partially directed toward the central transverse axis of the baling chamber based on the diametric size of the bale during formation; and
   wherein the processor is operable to execute the bale density control algorithm to detect a plug condition preventing crop movement into the baling chamber.

2. The round baler set forth in claim 1, wherein the plurality of fixed rollers includes an upper inlet roller supporting the forming belt along an upper edge of the inlet, and a lower inlet roller supporting the forming belt along a lower edge of the inlet, with the starter roll positioned proximate the upper inlet roller between the upper inlet roller and the lower inlet roller.

3. The round baler set forth in claim 2, wherein the starter roll is moveable between a first radial position relative to the central transverse axis for forming the bale having a first diametric size, and a second radial position relative to the central transverse axis for forming the bale having a second diametric size larger than the first diametric size.

4. The round baler set forth in claim 1, wherein the plurality of fixed rollers includes an upper inlet roller supporting the forming belt along an upper edge of the inlet, and further comprising a torque transmitting device interconnecting the upper inlet roller and the starter roll and configured for transmitting torque from the upper inlet roller to the starter roll to rotate the starter roll about a respective axis of rotation of the starter roll.

5. The round baler set forth in claim 1, further comprising a bracket attached to the starter roll and rotatably attached to the frame, whereby the bracket and the starter roll are rotatable relative to the frame to move the starter roll in the direction at least partially directed toward the central transverse axis of the baling chamber.

6. The round baler set forth in claim 5, wherein the plurality of fixed rollers includes an upper inlet roller supporting the forming belt along an upper edge of the inlet, and wherein the bracket and the starter roll are pivotable about an axis of rotation of the upper inlet roller whereby a separation distance between the starter roll and the upper inlet roller is maintained during movement of the starter roll.

7. The round baler set forth in claim 5, further comprising an actuator interconnecting the frame and one of the starter roll and the bracket, wherein the actuator is operable to move the bracket and the starter roll in the direction at least partially directed toward the central transverse axis of the baling chamber.

8. The round baler set forth in claim 1, wherein the starter roll is moveable along an arcuate path between a radially outermost position and a radial innermost position.

9. The round baler set forth in claim 8, wherein the movement of the starter roll is configured to maintain a minimum radially inward deformation distance of an exterior circumferential surface of the bale as the diametric size of the bale increases during formation.

10. The round baler set forth in claim 1, wherein the processor is operable to execute the bale density control algorithm to determine a diametric size of the bale within the baling chamber during formation.

11. The round baler set forth in claim 1, wherein the processor is operable to execute the bale density control algorithm to move the starter roll to a radial innermost position thereof in response to detection of the plug condition to increase a throat size of the inlet for alleviating the plug condition.

12. The round baler set forth in claim 1, wherein the starter roll is parallel with the central transverse axis and extends across a width of the baling chamber, and wherein the starter roll does not support the forming belt.

13. A round baler comprising:
a frame;
a forming belt defining a baling chamber having an inlet through which crop material enters into the baling chamber, wherein the baling chamber is operable to form crop material into a bale having a cylindrical shape;
a belt tensioning system having a plurality of fixed rollers rotatably supported by the frame, a tension arm moveable relative to the frame, and a plurality of moveable rollers rotatably supported by and moveable with the tension arm, wherein the plurality of fixed rollers and the plurality of moveable rollers support the forming belt in a circuitous path and wherein the tension arm and the moveable rollers move relative to the frame for maintaining tension in the forming belt while allowing a diametric size of the bale to increase during formation;
a starter roll positioned immediately upstream of the inlet relative to a rotational direction of the bale within the baling chamber during formation;

wherein the starter roll is moveable relative to the frame in a direction at least partially directed toward a central transverse axis of the baling chamber;
a controller including a processor and a memory having bale density control algorithm stored thereon, wherein the processor is operable to execute the bale density control algorithm to control movement of the starter roll in the direction at least partially directed toward the central transverse axis of the baling chamber based on the diametric size of the bale during formation; and
wherein the processor is operable to execute the bale density control algorithm to control movement of the starter roll in the direction at least partially directed toward the central transverse axis of the baling chamber based on a mass flow rate of crop material entering the baling chamber.

14. The round baler set forth in claim 13, wherein the processor is operable to execute the bale density control algorithm to determine the mass flow rate of the crop material entering the baling chamber.

15. A round baler comprising:
a frame;
a forming belt defining a baling chamber having an inlet through which crop material enters into the baling chamber, wherein the baling chamber is operable to form crop material into a bale having a cylindrical shape;
a belt tensioning system having a plurality of fixed rollers rotatably supported by the frame, a tension arm moveable relative to the frame, and a plurality of moveable rollers rotatably supported by and moveable with the tension arm, wherein the plurality of fixed rollers and the plurality of moveable rollers support the forming belt in a circuitous path and wherein the tension arm and the moveable rollers move relative to the frame for maintaining tension in the forming belt while allowing a diametric size of the bale to increase during formation;
a starter roll positioned immediately upstream of the inlet relative to a rotational direction of the bale within the baling chamber during formation;
wherein the starter roll is moveable relative to the frame in a direction at least partially directed toward a central transverse axis of the baling chamber;
wherein the frame includes a housing having a side wall at least partially forming the baling chamber and defining a slot therethrough, with the starter roll extending through the slot and moveable within the slot relative to the housing; and
a shield attached to and movable with one of the bracket and the starter roll, wherein the shield is shaped to cover the slot throughout a full range of movement of the starter roll to prevent movement of crop material through the slot.

16. A method of forming a bale, the method comprising:
providing a round baler including:
a frame;
a forming belt defining a baling chamber having an inlet through which crop material enters into the baling chamber, wherein the baling chamber is operable to form crop material into a bale having a cylindrical shape;
a belt tensioning system having a plurality of fixed rollers rotatably supported by the frame, a tension arm moveable relative to the frame, and a plurality of moveable rollers rotatably supported by and moveable with the tension arm, wherein the plurality of fixed rollers and the plurality of moveable rollers support the forming belt in a circuitous path and wherein the tension arm and the moveable rollers move relative to the frame for maintaining tension in the forming belt while allowing a diametric size of the bale to increase during formation;

a starter roll positioned immediately upstream of the inlet relative to a rotational direction of the bale within the baling chamber during formation;

positioning the starter roll in a radially outermost position;

feeding crop material through the inlet into the baling chamber, whereby movement of the forming belt along the circuitous path causes rotation of the crop material in the rotational direction thereby forming the crop material into a bale having cylindrical shape defining a diameter, with the starter roll radially deforming an exterior circumferential surface of the bale inward toward a center of the bale a minimum deformation distance when the bale exhibits a first initial diameter;

continue feeding crop material through the inlet into the baling chamber to increase the diameter of the bale within the baling chamber from the first initial diameter to a second diameter greater than the first initial diameter;

moving the starter roll relative to the frame from the radially outermost position in a direction at least partially directed toward a central transverse axis of the baling chamber while the diameter of the bale increases from the first initial diameter to the second diameter to substantially maintain the minimum deformation distance of the starter roll intrusion into the bale;

detecting a plug condition preventing crop movement into the baling chamber; and moving the starter roll to a radial innermost position thereof in response to detection of the plug condition to increase a throat size of the inlet for alleviating the plug condition.

17. A round baler comprising:

a frame;

a forming belt defining a baling chamber having an inlet through which crop material enters into the baling chamber, wherein the baling chamber is operable to form crop material into a bale having a cylindrical shape;

a belt tensioning system having a plurality of fixed rollers rotatably supported by the frame, a tension arm moveable relative to the frame, and a plurality of moveable rollers rotatably supported by and moveable with the tension arm, wherein the plurality of fixed rollers and the plurality of moveable rollers support the forming belt in a circuitous path and wherein the tension arm and the moveable rollers move relative to the frame for maintaining tension in the forming belt while allowing a diametric size of the bale to increase during formation; and a controller including a processor and a memory having bale density control algorithm stored thereon, wherein the processor is operable to execute the bale density control algorithm to detect a plug condition preventing crop movement into the baling chamber.

*    *    *    *    *